(12) United States Patent
Bushlow et al.

(10) Patent No.: US 9,043,823 B1
(45) Date of Patent: May 26, 2015

(54) DETECTING AND LOGGING TRIGGERED EVENTS IN A DATA STREAM

(71) Applicant: The DIRECTV Group, Inc., El Segundo, CA (US)

(72) Inventors: Robert J. Bushlow, Corona, CA (US); George Adler, Sherman Oaks, CA (US); Stephen H. Kiyabu, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/285,457

(22) Filed: May 22, 2014

Related U.S. Application Data

(63) Continuation of application No. 10/875,024, filed on Jun. 22, 2004, now abandoned.

(51) Int. Cl.
*H04N 21/442* (2011.01)
*H04N 21/8352* (2011.01)
*H04N 21/8358* (2011.01)
*H04N 21/439* (2011.01)

(52) U.S. Cl.
CPC ......... *H04N 21/442* (2013.01); *H04N 21/8352* (2013.01); *H04N 21/8358* (2013.01); *H04N 21/4394* (2013.01); *H04N 21/439* (2013.01)

(58) Field of Classification Search
None
See application file for complete search history.

(56) References Cited

U.S. PATENT DOCUMENTS

| | | | | |
|---|---|---|---|---|
| 5,481,294 A | * | 1/1996 | Thomas et al. | 725/20 |
| 5,848,396 A | * | 12/1998 | Gerace | 705/7.33 |
| 6,286,005 B1 | * | 9/2001 | Cannon | 705/14.66 |
| 6,353,444 B1 | * | 3/2002 | Katta et al. | 715/716 |
| 6,647,548 B1 | * | 11/2003 | Lu et al. | 725/20 |
| 2003/0131350 A1 | * | 7/2003 | Peiffer et al. | 725/18 |
| 2003/0221191 A1 | * | 11/2003 | Khusheim | 725/35 |

* cited by examiner

*Primary Examiner* — Justin Shepard

(57) ABSTRACT

A method and apparatus for detecting triggering events in a data stream, comprising extracting audio portions from the data stream, detecting a sequence of one or more Dual Tone Multiple Frequency (DTMF) signals representing the events from the extracted audio portions, and logging data representative of the sequence of DTMF signals into a database.

24 Claims, 4 Drawing Sheets

| ITEM | NAME | CHANNEL | DATE | TIME | STATUS | RECEIVER | STATION | EXPECTED TONE |
|---|---|---|---|---|---|---|---|---|
| 003871 | SAPS5 | DTMF1,1 | 2004/01/07 | 12:58:48:00 | OK | 1004-1029 | 1 | 121* |
| 003872 | SAPS5 | DTMF1,1 | 2004/01/07 | 12:59:48:00 | OK | 2004-2029 | 1 | |
| 003873 | SAPS4 | DTMF3,1 | 2004/01/07 | 13:00:16:22 | OK | 2004-2029 | 1 | |
| 003874 | SAPS4 | DTMF3,1 | 2004/01/07 | 13:00:16:22 | OK | 1004-1029 | 1 | 119 & 730* |
| 003875 | SAPS4 | DTMF3,1 | 2004/01/07 | 13:01:25:09 | OK | 1004-1029 | 1 | 119 & 730* |
| 003876 | SAPS4 | DTMF3,1 | 2004/01/07 | 13:01:25:10 | OK | 2004-2029 | 1 | 121* |
| 003877 | SAPS17 | DTMF5,1 | 2004/01/07 | 12:14:53:19 | OK | 1004-1029 | 1 | 121 |

DISPLAY 40

OK    CANCEL    PRINT    COMPARE

DETECTING AND LOGGING TRIGGERED EVENTS IN A DATA STREAM

BACKGROUND OF THE INVENTION

1. Field of the Invention

The present invention relates to detecting and logging triggered events in a data stream.

2. Description of the Related Art

Program materials for digital television, such as that provided by DIRECTV®, the assignee of the present invention, are typically transmitted as digital data streams encoded using the MPEG (Motion Pictures Experts Group) standard promulgated by the ISO (International Standards Organization). MPEG provides an efficient way to represent video and audio in the form of a compressed bit stream.

The MPEG-1 standard is described in a document entitled "Coding of Moving Pictures and Associated Audio for Digital Storage Media at up to about 1.5 MBit/s," ISO/IEC 11172 (1993), which is incorporated by reference herein. The MPEG-2 standard is described in a document entitled "Generic Coding of Moving Pictures and Associated Audio Information," ISO/IEC 13818 (1998), which is incorporated by reference herein.

As a satellite broadcaster, DIRECTV® requires that each of the channels of program materials be encoded into MPEG and statistically-multiplexed at a collection facility, before being transported via common carrier to a broadcast center for uplinking to satellites operated by DIRECTV®. Content providers, such as Disney®, Viacom®, HBO®, Showtime®, Starz®, ESPN®, etc., often provide DIRECTV® with a pre-encoded and statistically-multiplexed MPEG data stream.

At the present time, various viewing services manually review the program materials to determine if advertisements or other various events occur or are being broadcast. However, manually viewing the program materials is costly, error prone and inefficient. Consequently, there is need for a system by which such events can be detected in an automated fashion. The present invention satisfies that need.

SUMMARY OF THE INVENTION

The present invention discloses a method and apparatus for detecting triggering events in a data stream, comprising extracting audio portions from the data stream, detecting a sequence of one or more Dual Tone Multiple Frequency (DTMF) signals representing the events from the extracted audio portions, and logging data representative of the sequence of DTMF signals into a database.

BRIEF DESCRIPTION OF THE DRAWINGS

Referring now to the drawings in which like reference numbers represent corresponding parts throughout:

FIG. 3 is a diagram that illustrates the type of information displayed to user by the Log View Database Interface according to the preferred embodiment of the present invention.

DETAILED DESCRIPTION OF PREFERRED EMBODIMENTS

In the following description, reference is made to the accompanying drawings that form a part hereof, and which show, by way of illustration, several embodiments of the present invention. It is understood that other embodiments may be utilized and structural changes may be made without departing from the scope of the present invention.

Overview

The present invention comprises a system that automatically detects when certain triggering events occur within the program materials of a direct broadcast system. After being detected, the events are recorded in a database, where they may be used to generate reports or are otherwise displayed or presented to an end user.

In a preferred embodiment, an event is signaled by the presence of a sequence of one or more Dual Tone Multiple Frequency (DTMF) signals within an audio portion of a data stream for program materials. Data representative of the sequence of DTMF signals are then logged into a database. Also logged into the database are data representative of the date, time, channel, etc. associated with the sequence of DTMF signals. The data are then available for reporting and presentation to end users.

Exemplary Environment

Figure 1:
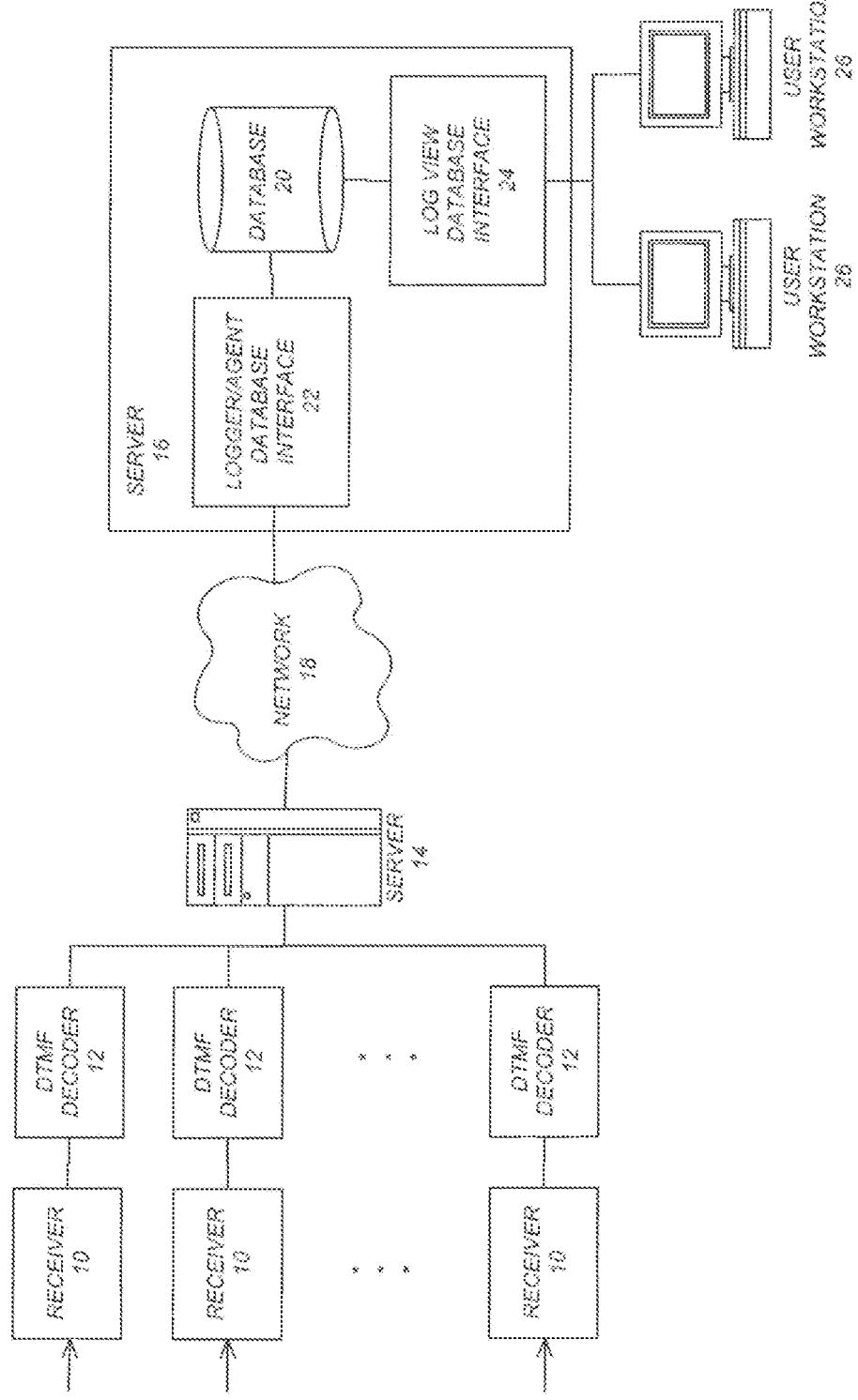
FIG. 1 is a block diagram illustrating an exemplary environment used to implement the preferred embodiment of the present invention.

FIG. 1 is a block diagram illustrating an exemplary environment used to implement the preferred embodiment of the present invention. In FIG. 1, a plurality of receivers 10 each receive one or more data streams containing program materials from a plurality of content providers or other sources. Each of the receivers 10 outputs audio portions of the data streams to a DTMF decoder 12. When a DTMF decoder 12 detects a sequence of DTMF signals in the audio portions of the data streams, it outputs a message to a server 14, wherein the message includes data representative of the sequence of DTMF signals, date, time, channel, location, source, etc. The server 14, in turn, generates a message that is transmitted to another server 16 via a network 18, wherein the message contains the data representative of the sequence DTMF signals, date, time, channel, location, source, etc. The data contained in the message is then stored in a database 20 by a DTMF Logging Application Program (DLAP) 22. A Log View Database Interface 24 is also provided, so that one or more User Workstations 26 can access the database 20 as needed, for reports and other presentations of data stored within the database 20.

Figure 2:
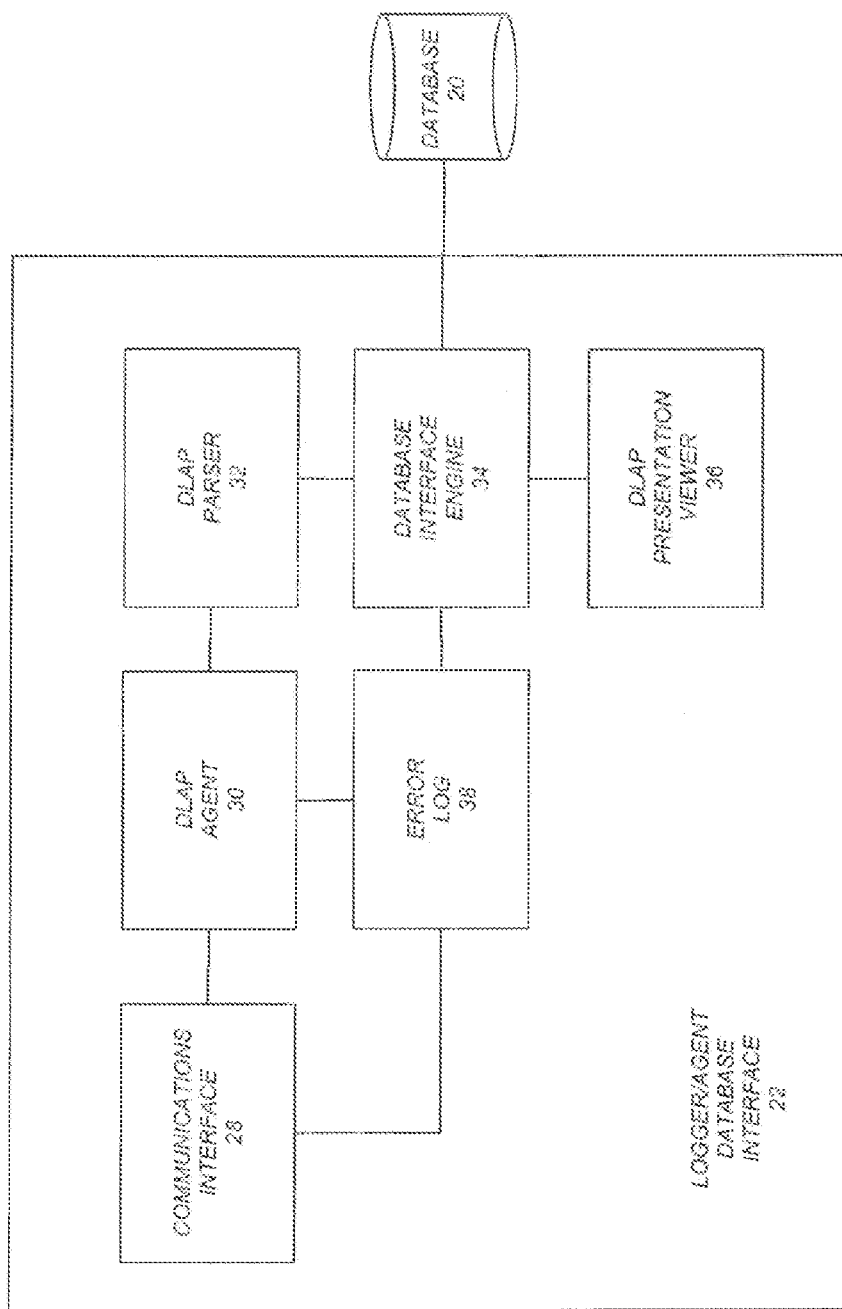
FIG. 2 is a block diagram further illustrating the components of the DTMF Logging Application Program according to the preferred embodiment of the present invention.

FIG. 2 is a block diagram further illustrating the components of the DTMF Logging Application Program 22 according to the preferred embodiment of the present invention. In FIG. 2, the DTMF Logging Application Program 22 includes a communications interface 28 for receiving the messages, a DLAP agent 30 for coordinating the functions of the DTMF Logging Application Program 22, a DLAP parser 32 for parsing the messages, a Database Interface Engine 34 for storing data from the messages in the database 20 and for retrieving the stored data as required, a DLAP Presentation Viewer 36 for formatting data retrieved from the database 20 for presentation to end users, and an Error Log 38 for storing error messages generated during processing.

An advantage of the present invention is the ability to obtain, interactively from the system, relevant information about each event after the sequence of DTMF signals has completed, for a multiplicity of control and evaluation functions. For example, through the use of previously established and defined sequences of DTMF signals, and their association with service codes, each sequence of DTMF signals may represent a particular service code, which in turn represents a category of program material, or a particular content provider, or a type of programming offered by the content provider. The sequences of DTMF signals can also be used to access appropriate databases to obtain further information, such as expected sequence, description, location and Broadcast Operations Center (BOC) address.

The data stored in the database 20 may be used to generate any number of reports or presentations to the end user. For example, the reports and presentations may include a breakdown of the sequence of DTMF signals, dates, times, channels, etc., such as time of day, day of week, location of event, channel of event, receiver, station number, channel-pairing information, etc. In another example, the reports and presentations may be used to access heuristic information from other databases to formulate a comprehensive report to monitor the triggering events during some specified time period, such as event counts, averages and percentages of events in time ranges or for days of the week. In still another example, the reports and presentations may also identify events that have not occurred during a specified time period, or events that have not been completed during a specified time period.

FIG. 3 is a diagram that illustrates an example of the type of information that may be displayed 40 to the end user by the Log View Database Interface 24 according to the preferred embodiment of the present invention. In this example, records from the database 20 are displayed 40 in a list, wherein each record includes columns comprising an item (record) identifier, name of the event, channel where the event occurred, date and time of the event, status, receiver, station, and expected sequence of DTFM signals. Of course, other information could be displayed 40 as well.

Logic of the Preferred Embodiment

Figure 4:
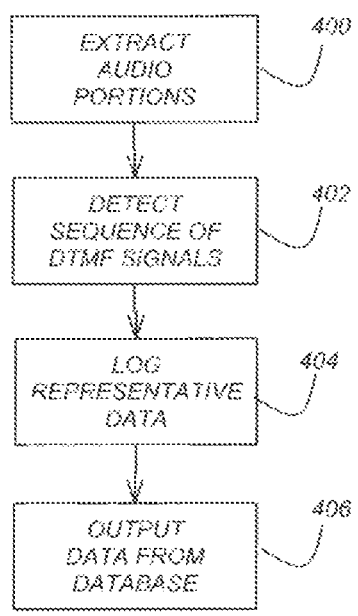
FIG. 4 is a flowchart that illustrates the logic of detecting triggering events in a data stream as performed by the preferred embodiment of the present invention.

FIG. 4 is a flowchart that illustrates the logic of detecting triggering events in a data stream as performed by the preferred embodiment of the present invention. Block 400 represents the step of extracting audio portions from the data stream, wherein the data stream comprises program materials to be transmitted by a direct broadcast system.

Block 402 represents the step of detecting a sequence of one or more Dual Tone Multiple Frequency (DTMF) signals representing the events from the extracted audio portions. The sequence of DTMF signals may identify advertisements in the program materials, the sequence of DTMF signals may represent a particular category of program material, the sequence of DTMF signals may represent a particular content provider for the program materials, or the sequence of DTMF signals may represent a type of programming offered by the content provider.

Block 404 represents the step of logging data representative of the sequence of DTMF signals into a database. This step further comprises logging data representative of the date, time and channel associated with the sequence of DTMF signals into the database.

Block 406 represents the step of outputting the data from the database to an end user. This step may comprise displaying the logged data to an end user or generating reports from the logged data for the end user.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching.

For example, while the foregoing disclosure presents an embodiment of the present invention as it is applied to a direct broadcast system, the present invention can be applied to any application that uses event triggers within a data stream. Moreover, although the present invention is described in terms of MPEG data streams, it could also be applied to other data streams as well. Finally, although specific logic is described herein, those skilled in the art will recognize that other logic may accomplish the same result, without departing from the scope of the present invention.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for automatically reviewing program material transmitted in a digital data stream, comprising:
   (a) extracting an audio portion from a digital data stream comprised of one or more channels of program material in at least one receiver, wherein the digital data stream comprises program material to be transmitted by a broadcaster and is received by the broadcaster from a content provider or other source before being broadcast;
   (b) determining whether advertisements or other events are present in the program material by detecting a sequence of one or more Dual Tone Multiple Frequency (DTMF) signals from the extracted audio portion in at least one decoder connected to the receiver; and
   (c) recording data representative of the sequence of DTMF signals from the decoder into a database of at least one computer connected to the decoder for subsequent use in generating reports or presentations.

2. The method of claim 1, wherein the digital data stream comprises an MPEG digital data stream received by the broadcaster from the content provider or other source before being broadcast.

3. The method of claim 1, wherein the receiver only outputs the audio portion of the digital data stream to the decoder.

4. The method of claim 1, wherein the decoder detects the sequence of DTMF signals in the extracted audio portions, and outputs the data representative of the sequence of DTMF signals to the computer.

5. The method of claim 1, wherein the sequence of DTMF signals identifies the advertisements in the program material.

6. The method of claim 1, wherein the sequence of DTMF signals represents a category of the program material.

7. The method of claim 1, wherein the sequence of DTMF signals represents a content provider for the program material.

8. The method of claim 1, wherein the sequence of DTMF signals represents a type of programming offered by the content provider.

9. The method of claim 1, wherein the data representative of the sequence of DTMF signals recorded into the database includes a name for the advertisements or other events, a channel where the advertisements or other events occurred, a date when the advertisements or other events occurred, a time when the advertisements or other events occurred, an identifier for the receiver, or an expected sequence of DTFM signals.

10. The method of claim 1, wherein the reports or presentations identify advertisements or other events that have not occurred during a specified time period.

11. The method of claim 1, wherein the reports or presentations identify advertisements or other events that have not been completed during a specified time period.

12. The method of claim 1, wherein heuristic information is accessed to formulate a report to monitor the advertisements or other events that occurred during a specified time period, wherein the heuristic information includes counts, averages or percentages of the advertisements or other events that occurred during the specified time period.

13. A system for automatically reviewing program materials transmitted in a digital data stream, comprising:
   (a) at least one receiver for extracting an audio portion from a digital data stream comprised of one or more channels of program material, wherein the digital data stream comprises program material to be transmitted by a broadcaster and is received by the broadcaster from a content provider or other source before being broadcast;
   (b) at least one decoder, connected to the receiver, for determining whether advertisements or other events are present in the program material by detecting a sequence of one or more Dual Tone Multiple Frequency (DTMF) signals from the extracted audio portion; and
   (c) at least one computer, connected to the decoder, for recording data representative of the sequence of DTMF signals from the decoder into a database for subsequent use in generating reports or presentations.

14. The system of claim 13, wherein the digital data stream comprises an MPEG digital data stream received by the broadcaster from the content provider or other source before being broadcast.

15. The system of claim 13, wherein the receiver only outputs the audio portion of the digital data stream to the decoder.

16. The system of claim 13, wherein the decoder detects the sequence of DTMF signals in the extracted audio portions, and outputs the data representative of the sequence of DTMF signals to the computer.

17. The system of claim 13, wherein the sequence of DTMF signals identifies the advertisements in the program material.

18. The system of claim 13, wherein the sequence of DTMF signals represents a category of the program material.

19. The system of claim 13, wherein the sequence of DTMF signals represents a content provider for the program material.

20. The system of claim 13, wherein the sequence of DTMF signals represents a type of programming offered by the content provider.

21. The system of claim 13, wherein the data representative of the sequence of DTMF signals recorded into the database includes a name for the advertisements or other events, a channel where the advertisements or other events occurred, a date when the advertisements or other events occurred, a time when the advertisements or other events occurred, an identifier for the receiver, or an expected sequence of DTFM signals.

22. The system of claim 13, wherein the reports or presentations identify advertisements or other events that have not occurred during a specified time period.

23. The system of claim 13, wherein the reports or presentations identify advertisements or other events that have not been completed during a specified time period.

24. The system of claim 13, wherein heuristic information is accessed to formulate a report to monitor the advertisements or other events that occurred during a specified time period, wherein the heuristic information includes counts, averages or percentages of the advertisements or other events that occurred during the specified time period.

* * * * *